United States Patent [19]

Mueller et al.

[11] 4,404,241
[45] Sep. 13, 1983

[54] MICROWAVE PACKAGE WITH VENT

[75] Inventors: Robert L. Mueller; Jerome A. Cherney, both of Appleton, Wis.

[73] Assignee: James River-Dixie/Northern, Inc., S. Norwalk, Conn.

[21] Appl. No.: 105,413

[22] Filed: Dec. 19, 1979

[51] Int. Cl.³ .................... B65B 25/22; B65D 51/16; B65D 65/10; B65D 65/38
[52] U.S. Cl. .................... 428/35; 156/252; 156/253; 156/256; 206/524.2; 206/524.3; 206/524.6; 206/525; 426/113; 426/118; 426/127; 428/76; 428/81; 428/138; 428/339; 428/341; 428/342; 428/509; 428/511; 428/513; 428/518
[58] Field of Search ............ 428/138, 35, 76, 81, 428/486, 511, 521, 484, 339, 341, 342, 509, 513, 518, 127; 156/253, 252, 256; 206/525, 524.2, 524.3, 524.6; 426/113, 118, 127

[56] References Cited

U.S. PATENT DOCUMENTS

| 2,633,284 | 3/1953 | Moffett et al. | 229/2.5 R |
|---|---|---|---|
| 2,777,769 | 1/1957 | Hodges | 426/113 |
| 3,052,554 | 9/1962 | Colman | 426/111 |
| 3,398,041 | 8/1968 | Ferree | 428/138 |
| 3,496,062 | 2/1970 | MacLeod et al. | 428/486 |
| 3,576,649 | 4/1971 | Brazier | 426/127 |
| 3,654,064 | 4/1972 | Laumann | 428/219 X |
| 3,672,916 | 6/1972 | Virnig | 229/43 X |
| 3,777,099 | 12/1973 | Levinson | 219/10.55 |
| 3,876,131 | 4/1975 | Tolaas | 206/491 X |
| 4,013,798 | 3/1977 | Gottsos | 426/107 |
| 4,096,948 | 6/1978 | Kuchenbecker | 206/491 X |
| 4,141,487 | 2/1979 | Faust et al. | 229/43 |
| 4,210,674 | 7/1980 | Mitchell | 426/107 |

*Primary Examiner*—James C. Cannon
*Attorney, Agent, or Firm*—Finnegan, Henderson, Farabow, Garrett & Dunner

[57] ABSTRACT

Multilayered sheet material, a method for producing said material and a package comprising said material are provided. The multilayered material and package produced therefrom have apertures sealed with an extrudable hot melt material which conveys moisture barrier properties and is adapted to soften and permit venting of vapor generated in the package prior to distortion of the package. The packages are adapted particularly for use as containers or as components thereof when used in heating or cooking of foods in microwave ovens.

14 Claims, 3 Drawing Figures

MICROWAVE PACKAGE WITH VENT

BACKGROUND OF THE INVENTION

1. Prior Art

The prior art is believed to be best exemplified by the following patents:

| Tolaas | 3,876,131 | 4/8/75 |
|---|---|---|
| Hodges | 2,777,769 | 1/15/57 |
| Moffett | 2,633,284 | 3/31/53 |
| Levinson | 3,777,099 | 12/4/73 |
| Gottsos | 4,013,798 | 3/22/77 |
| Ferree | 3,398,041 | 8/20/68 |
| Kuchenbecker | 4,096,948 | 6/27/78 |
| Faust | 4,141,487 | 2/27/79 |
| Virnig | 3,672,916 | 6/27/72 |

Patent Application:

Mitchell, Ser. No. 971,318 filed Dec. 20, 1978, now U.S. Pat. No. 4,210,674.

2. Background of the Invention

This invention relates to an improvement in convenience food packages adapted to contain a product which may be subjected within the package to elevated temperatures.

In the preparation of refrigerated packaged food for serving in a heated state, it has been the practice to place the packaged food in a microwave oven to heat the same. Heating may be either for the purpose of thawing and cooking frozen foods or for thawing and heating cooked foods. In either event, considerable water vapor pressure is generated, and since packages are usually well sealed while stored, precautions are usually taken to ensure against sudden explosions by providing for adequate venting of the package. One means that has been utilized comprises building weakened areas in the package seals that rupture on buildup of water vapor pressure. Another means has been in the form of a plastic cover or coating over an aperture that is removed physically prior to using the package or which has been oriented to have a memory and which retracts on exposure to certain temperatures.

U.S. Pat. No. 4,141,487 is believed material to the examination of this application in its disclosure of a package for enclosing a food product wherein a continuous layer of plastic film forms the upper wall surface of the package, has a fold over section to form at least one pleated section having an interior fold line and an elongated opening passing through the layer along the fold line for venting gas during cooking. An adhesive sealant material seals the pleated section until a predetermined temperature is reached, at which time the sealed pleated section opens to expose the opening and vent the package. In this disclosure, the vent aperture is left open and is sealed off by the fold-over section of material. The package requires additional material and distorts because pressure builds up in the pouch to force the fold-over to unfold thereby freeing the vent aperture after the sealant holding the foldover in place has melted. Materials employed as sealants melt within the range of 120° F. to 150° F.

Packages embodying the above described means are subject to distortion by pressure generated within the pouch or package before venting occurs.

A package for containing vapor-generating materials that remains substantially flat during use is highly desirable for some applications, for example, wherein such vapor-generating materials are contained in a package within a package and space or other considerations necessitate that the package vent without substantial distortion or pillowing.

It is an object of this invention to provide a material suitable for production of a package that is capable of venting vapor generated therewithin without substantial distortion of the package.

It is a further object of this invention to provide a package or component thereof formed from such material.

Yet another object is to provide a method for producing such material.

SUMMARY OF THE INVENTION

This invention relates to the provision of a multilayered sheet material, and a method for its production, that is suitable in forming a package or a component thereof particularly adapted for applications where there is a need for venting without distortion of the package and especially when it is necessary to maintain a substantially flat surface in such package.

The invention provides a package or component thereof with means for venting vapor generated therein as it develops and prior to such buildup that distorts the package.

The invention relates to a multilayered sheet material, adapted for use in a package or as a component thereof, for venting vapor generated by a material contained therein which comprises an apertured multilayer substrate having a continuous layer of an extrudable hot melt material bonded thereto and sealing the interstices defining the apertures.

The invention further relates to a method for producing such sealed apertured multilayered sheet material which comprises passing the apertured multilayer sheet material into a nip formed between a pressure roll and a chill roll while simultaneously passing a hot melt extrusion of an ethylene-vinyl acetate-wax hot melt into the nip between the multilayered sheet and the pressure roll, the hot melt material being applied to the sheet while passing through said aperture onto a release material on the underlying pressure roll whereby, upon pressing the rolls together, the extruded material is released from the pressure roll to seal the interstices defining the apertures.

The invention further relates to a package formed from such multilayered sheet material for containing a vapor generating material, adapted to vent such vapor while maintaining the package in a substantially uniform flat condition.

DESCRIPTION OF THE PREFERRED EMBODIMENT

Figure 1:
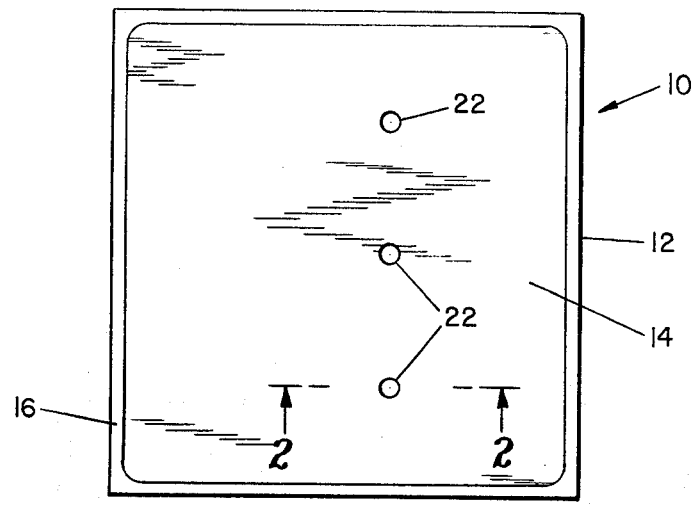
FIG. 1 is an elevational view showing a package embodying the invention.

With more detailed reference to the drawing, and first to FIG. 1, there is illustrated a substantially flat package in the form of a packet 10 having a bottom portion 12 sealed to a lid or top portion 14 along their respective edges to form a peripheral seal 16. A cavity 18 is formed between the top and bottom portions for containing a vapor-generating product 20.

Figure 2:
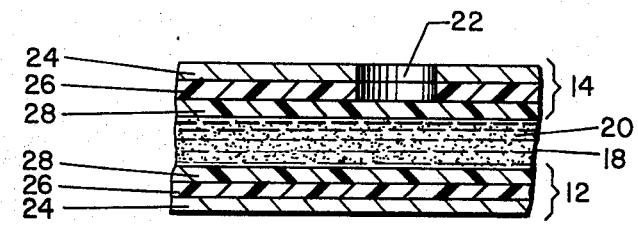
FIG. 2 is a fragmentary sectional taken along line 2—2 of FIG. 1.

Lid portion 14 is formed of a multilayer sheet material having at least one aperture 22 which extends through the layers comprising the sheet. With reference to FIG. 2, the wall construction of packet 10 is formed from said multilayered sheet material containing a first layer 24 of paper, cellophane or the like bonded to a layer 26 of low density polyethylene which in turn is bonded to a layer 28 of an extrudable hot melt. Aperture 22 extends through both the paper and polyethylene layers and is sealed at its inner edge by the hot melt material 28. When the package is exposed to microwave energy, steam or other vapor generated therein must be rapidly vented to avoid pillowing or distortion of the packet. Maintaining a substantially uniform flat surface is essential when the packet is employed, for example, to contain a vapor-generating material placed within a package wherein space or other considerations require that package distortion be avoided. In such cases it is necessary that venting take place to release any vapors generated before pressure can build up to pillow or distort the packet.

Our attempts to provide such a characteristic using materials to seal the apertures other than extrudable hot melts were unsuccessful, the extrudable hot melts being uniquely suitable for this purpose.

Suitable extrudable hot melt materials are those having a melt flow index of 3 to 20 grams/minute at 125° C. (as per ASTM D 12-38 Condition A) and especially ethylene-vinyl acetate-wax hot melts available commercially from Pierce and Stevens Chemical Corporation as "E-4080", "E-4090" and "E-4050". Because such high viscosity materials are extrudable, they may be employed to cover the apertures in a thickness sufficient to provide a physical barrier and permit a completely sealed package having water vapor barrier properties to protect the contents of the package. Typical coating thicknesses may vary from about 7 to about 50 lbs./ream and preferably from about 20 to 30 lbs./reams. These coating weights are not possible when employing lower viscosity-lower melting adhesive materials normally applied as coatings by roller coating or rotogravure methods. Such materials and methods usually permit lay down of a maximum thicknesses of about 2 to 3 lbs./ream with problems of "run-off" and insufficient body to function as necessary in this invention.

The extrudable hot melt serves multiple functions in the multilayer sheet material of the invention. It serves as a sealant layer as above described. It physically covers apertures formed in the lid substrate and maintains closure thereof during handling, wind-up, formation into packages, frozen storage and shipping. It provides a moisture barrier to protect the product contained in the package against moisture loss or gain prior to exposure to microwave, and it comprises an essential feature of the relief valve of the invention.

The hot melts employed do not have a sharp melting point and gradually soften and flow responsive to heat and pressure. For example, without generation of any pressure at all, softening and flow to the point of venting occurs at a temperature within the range of about 275° F. to 325° F. However, when the material is subjected to slight pressure in combination with heat, softening and flow occurs at temperatures effective to permit venting without sufficient pressure build-up to distort the package, permitting venting as the vapor is generated. Typical softening flow temperatures are not known with certainty but are believed to be within the range of about 200° F. to about 250° F. whereby steam or other vapor generated is released in less than 20 to 35 seconds.

The multilayered sheet material is produced by a method which requires special consideration to the fact that a hot melt material at elevated temperature is being applied to an apertured material and thus may cause sticking problems. The material is produced by the steps of:

(a) providing a multilayered sheet material substrate;

(b) forming at least one aperture in said substrate that extends through the layers comprising the substrate;

(c) passing the apertured multilayered substrate into a nip formed between a pressure roll and a chill roll while simultaneously passing a hot melt extrusion of a hot melt material into the nip between the substrate and the pressure roll, the extruded material being applied to the substrate material and passing through said aperture to contact release material on the underlying pressure roll whereby when the rolls are pressed together, the extruded material is released to seal the interstices defining the aperture.

Figure 3:
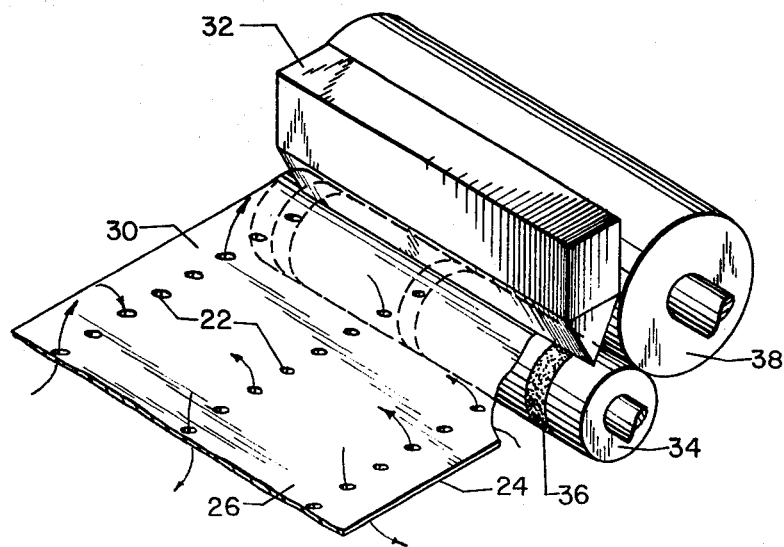
FIG. 3 is a fragmentary view of sheet material being extrusion coated according to the method of the invention.

As illustrated in FIG. 3, in accord with the best mode for practicing the method, a web of multilayered sheet material 30 of polyethylene coated paper containing apertures 22 is mounted on a conveyor or suitable means for passing the substrate to a conventional extrusion die arrangement. The apertured substrate 30 is passed into the nip formed between the pressure roll 34 and the chill roll 38 while simultaneously a hot melt extrusion 28 of the ethylene-vinyl acetate-wax is passed from die 32 into the nip between the polyethylene side 26 of the substrate and the pressure roll 34. To prevent the portion of the extrudable hot melt that passes through the aperture 22 from sticking to the pressure roll, strips of release material 36, for example, release tape available commercially as "TEFLON" are wrapped around the pressure roll at positions corresponding to the apertures or alternatively covering the entire pressure roll. As the apertured substrate and hot melt enter the nip of the pressure roll and chill roll, the extrudable hot melt contacts the release material and is stripped off to fill and seal the apertures. It is further solidified therein as the web passes the chill roll and is conveyed to windup.

The extrudable hot melt vent covering is a continuous, even thickness across the entire web. The web stock thus can be produced in roll form, stored, shipped and used by a customer who fills a package comprising the sealed, apertured multi-layered sheet material or otherwise employs such sheet material as a component of package.

The substrate 14 which is punched or otherwise treated to form the apertures can comprise a first layer of any material capable of maintaining dimensional stability when exposed to temperatures reached in the cooking or heating operations and not interfering with the cooking or heating operations. Paper or cellophane are preferred although high density polyethylene may be used for temperatures up to about 215° F. For higher temperatures, combination substrates containing low density polyethylene, paper, cellophane, polyester film or heat resistant film may be used.

The lower portion 12 of the packet may likewise be formed of any materials capable of withstanding the temperatures of the cooking or heating operation and may be the same as or different from the lid stock material 14. Preferably, for ease of manufacture, the material forming the lower portion 12 will be a material that is heat sealable to the material forming the top portion 14.

Apertures may be varied in number and size to accomplish the objectives of the invention. Thus it has been found for a package 4½ inches×4½ inches, a single 1 inch diameter circular aperture or four ¼ inch diameter apertures function equivalently to release steam without pillowing. A pouch of the same dimensions formed from 25 lbs./ream paper—22 lbs./ream low density polyethylene and 28 lbs./ream extrudable hot melt was found to have a moisture vapor transmission rate (MVTR) of 0.6g/100 sq. in./24 hours when tested over both apertured and non-apertured areas. The same structure without the extrudable hot melt coating had a MVTR of 0.9 g/100 sq. in./24 hours, and did not vent to prevent pillowing in a microwave oven. The polyethylene does not open at sufficiently low temperature to permit release of steam prior to build-up of pressure and pillowing of the container.

The apertured, sealed lid stock material 14 comprising a layer of polyethylene coated paper or similar substrate coated with an extrudable hot melt may be employed for any of a number of applications where a quick vent that prevents package distortion is desired.

For example, such material may be employed as lid stock sealable to relatively flat compartmented trays as disclosed in U.S. Pat. No. 4,013,798 wherein the tray comprises different food products and it is desired that water vapor from each product vent sequentially so that vapor from one compartment does not enter another compartment. Such relatively flat trays are heated in a microwave oven in a relatively flat shielding box. The lid stock of this invention may be employed advantageously in conjunction with such structures to permit venting without package distortion.

We claim:

1. A multilayered sheet material, adapted for use in a package or as a component thereof for venting vapor generated by a material contained therein when subjected to cooking temperatures, which comprises: a substrate of heat-resistant material, capable of maintaining dimensional stability, when exposed to cooking temperatures and operations, and not interfering with said cooking operation, said substrate having at least one aperture formed therein that extends from its top surface to its bottom surface; and a continuous sealing layer of an extrudable hot melt material having a melt flow index of about 3 to 20 grams/minute at 125° C. bonded to a surface of said substrate and extending over the interstice defining said aperture said sealing layer extending over said interstice being operable to soften and flow when exposed to said cooking temperatures to vent the vapor generated by cooking.

2. A multilayered sheet material as claimed in claim 1, in which said substrate is paper or cellophane.

3. A multilayered sheet material as claimed in claim 2, in which said extrudable hot melt is a mixture of ethylene-vinyl acetate and wax.

4. A multilayered sheet material as claimed in claim 3, in which a plurality of apertures are present in said substrate material and sealed with said hot melt.

5. A multilayered sheet material, adapted for use in a package or as a component thereof for venting vapor generated by a material contained therein when subjected to cooking temperatures, which comprises a first layer of paper or cellophane bonded to a continuous layer of low density polyethylene, said polyethylene-paper or cellophane-paper layers having at least one aperture formed therein that extends from its top surface to its bottom surface; and a continuous sealing layer of an extrudable hot melt material having a melt flow index of about 3 to 20 grams/minute at 125° C., bonded to said polyethylene surface of the sheet material opposite the surface to which said paper or cellophane is bonded and extending over the interstice defining said aperture, said sealing layer extending over said interstice being operable to soften and flow when exposed to said cooking temperatures to vent the vapor generated by cooking.

6. A multilayer sheet material as claimed in claim 5, in which a plurality of apertures are present in said polyethylene-paper or cellophane-paper layers and wherein said sealing layer extends over the interstices defining said apertures.

7. A method for producing a multilayered sheet material comprising at least one sealed aperture, which comprises the steps of:
(a) providing a substrate comprising a first layer of a material capable of maintaining dimensional stability when exposed to cooking temperatures and operations, and not interfering with said cooking operations;
(b) forming apertures in said substrate that extend through the substrate;
(c) passing the apertured substrate into a nip formed between a chill roll and a pressure roll while simultaneously passing a hot melt extrusion of an ethylene-vinyl acetate-wax material having a melt flow index of about 3 to 20 grams/minute at 125° C. into the nip between the substrate and the pressure roll, the extruded material being applied to said substrate material and passing through said apertures to release material on the underlying pressure, whereby when the rolls are pressed together, the extruded material is released from the pressure roll to bond as a layer to a surface of said substrate and extend over and seal the interstices defining the apertures, the sealing layer so formed being operable to soften and flow when exposed to said cooking temperatures to vent the vapor generated by cooking.

8. A method for producing a multilayered sheet material comprising sealed apertures formed in said sheet material which comprises the steps of:
(a) providing a multilayered substrate comprising paper or cellophane bonded to a low density polyethylene layer;
(b) forming a plurality of apertures in said multilayered substrate that extend through the layers comprising the sheet material;
(c) passing the apertured multilayer sheet material into a nip formed between a chill roll and a pressure roll while simultaneously passing a hot melt extrusion of an ethylene-vinyl acetate wax material having a melt flow index of about 3 to 20 grams/minute at 125° C. and having a thickness within the range of about 7 to 50 lbs./ream into the nip between the polyethylene side of the substrate and the pressure roll; the extruded material being applied as a continuous layer to said substrate material and passing through said apertures to release material on the underlying pressure roll, whereby when the pressure roll and chill rolls are pressed together, the extruded material is released from the pressure roll to bond as a layer to a surface of said substrate and extend over and seal the interstices defining the apertures, the sealing layer so formed being operable to soften and flow when exposed to said cooking temperatures to vent the vapor generated by cooking.

9. A method as claimed in claim 8, in which said substrate comprises paper coated with polyethylene at a weight of about 22 lbs./ream.

10. A method as claimed in claim 9, in which said extrusion coating is applied at a weight of about 28 lbs./ream.

11. A package for containing vapor-generating material and adapted to vent such vapor while maintaining said package in a substantially uniform flat condition which comprises: a bottom portion bonded along its peripheral edges to a top portion and having a cavity therebetween for containing a vapor-generating material, said top portion comprising a multilayered sheet material formed from a first layer capable of maintaining dimensional stability when exposed to elevated temperatures bonded to a second layer of polyethylene, said polyethylene bonded substrate having at least one aperture formed therein that extends from its top surface to its bottom surface and a continuous layer of an extrudable hot melt material having a melt flow index of about 3 to 20 grams/minute at 125° C. bonded to said polyethylene surface of the substrate and sealing the interstice defining said aperture, said hot melt material sealing the aperture conveying moisture barrier properties to the package at other than cooking temperatures and softening when exposed to cooking temperatures to soften and flow to vent vapor generated by cooking prior to distortion of the package.

12. A package as claimed in claim 11, in which said polyethylene bonded substrate comprises a plurality of apertures sealed with said continuous layer of extrudable hot melt material.

13. A package as claimed in claim 12, in which said hot melt sealing said apertures softens at a temperature within the range of about 200° to 250° F. permitting venting as the vapor is generated to prevent distortion of the package.

14. A package for containing vapor-generating material and adapted to vent such vapor while maintaining said package in a substantially uniform flat condition which comprises:
a bottom portion bonded along its peripheral edges to a top portion and having a cavity therebetween for containing a vapor-generating material; said top and bottom portions comprising a multilayered sheet material, said sheet material forming said top portion having a plurality of apertures formed therein that extend from the top surface to the bottom surface of the sheet material and a continuous layer of an extrudable ethylene-vinyl acetate-wax material having a melt flow index of about 3 to 20 grams/minute at 125° C. bonded to a surface of the sheet material and sealing the interstices defining said apertures;
said hot melt material sealing said apertures conveying moisture barrier properties to the package at other than cooking temperatures and softening when exposed to cooking tenperatures to soften and flow to vent vapor generated by cooking prior to distortion of the package.

* * * * *